United States Patent [19]

Reum

[11] 4,120,929
[45] Oct. 17, 1978

[54] METHOD FOR PRODUCING A SPIRALLY WOUND PLASTIC ARTICLE

[76] Inventor: Donald J. Reum, P.O. Box B, Albany, Minn. 56307

[21] Appl. No.: 755,079

[22] Filed: Dec. 28, 1976

[51] Int. Cl.$^2$ ............................................. B29C 17/00
[52] U.S. Cl. ................................. 264/210 R; 264/281
[58] Field of Search .............. 264/280, 281, 168, 103, 264/210 R; 425/319, 391

[56] References Cited

U.S. PATENT DOCUMENTS

| | | | |
|---|---|---|---|
| 1,584,283 | 5/1926 | Fraser | 264/281 |
| 2,039,475 | 5/1936 | Campbell | 264/281 |
| 2,363,826 | 11/1944 | Fellis | 264/281 |
| 2,575,747 | 11/1951 | Cook | 264/281 |
| 2,601,269 | 6/1952 | Fisch | 264/281 |
| 2,736,676 | 2/1956 | Frickert | 264/168 |
| 2,994,103 | 8/1961 | Mittag | 264/281 |
| 3,388,545 | 6/1968 | Cannon et al. | 264/103 |
| 3,454,695 | 7/1969 | Holmgren | 264/281 |
| 4,022,860 | 5/1977 | Sugeno et al. | 264/281 |

Primary Examiner—Jay H. Woo

Attorney, Agent, or Firm—Clarence A. O'Brien; Harvey B. Jacobson

[57] ABSTRACT

A strip of heated thermoplastic material is extruded from a die past first and second stations while the strip is drawn down between the die and the first station. Initial cooling of the strip is performed at the first station and further drawing down of the strip is effected between the first and second stations. The strip is thereafter guided through a plurality of spaced convolutions about a journaled cylindrical member driven at a peripheral speed substantially equal to the linear speed of the strip as it enters the second station. Substantial full cooling of the spiral strip is performed at the second station by a bath of cooling liquid through which the strip is linearly advanced and the strip is subsequently driven, at a linear speed substantially equal to the peripheral speed of the cylindrical member, from the second station into a third station in which the coiled strip is cradled between parallel rollers driven at peripheral speeds substantially equal to the linear advancing speed of the coiled strip. The cradled strip is subsequently annealed during its movement through the third station by both internal and external sprays of heated liquid thereon.

8 Claims, 8 Drawing Figures

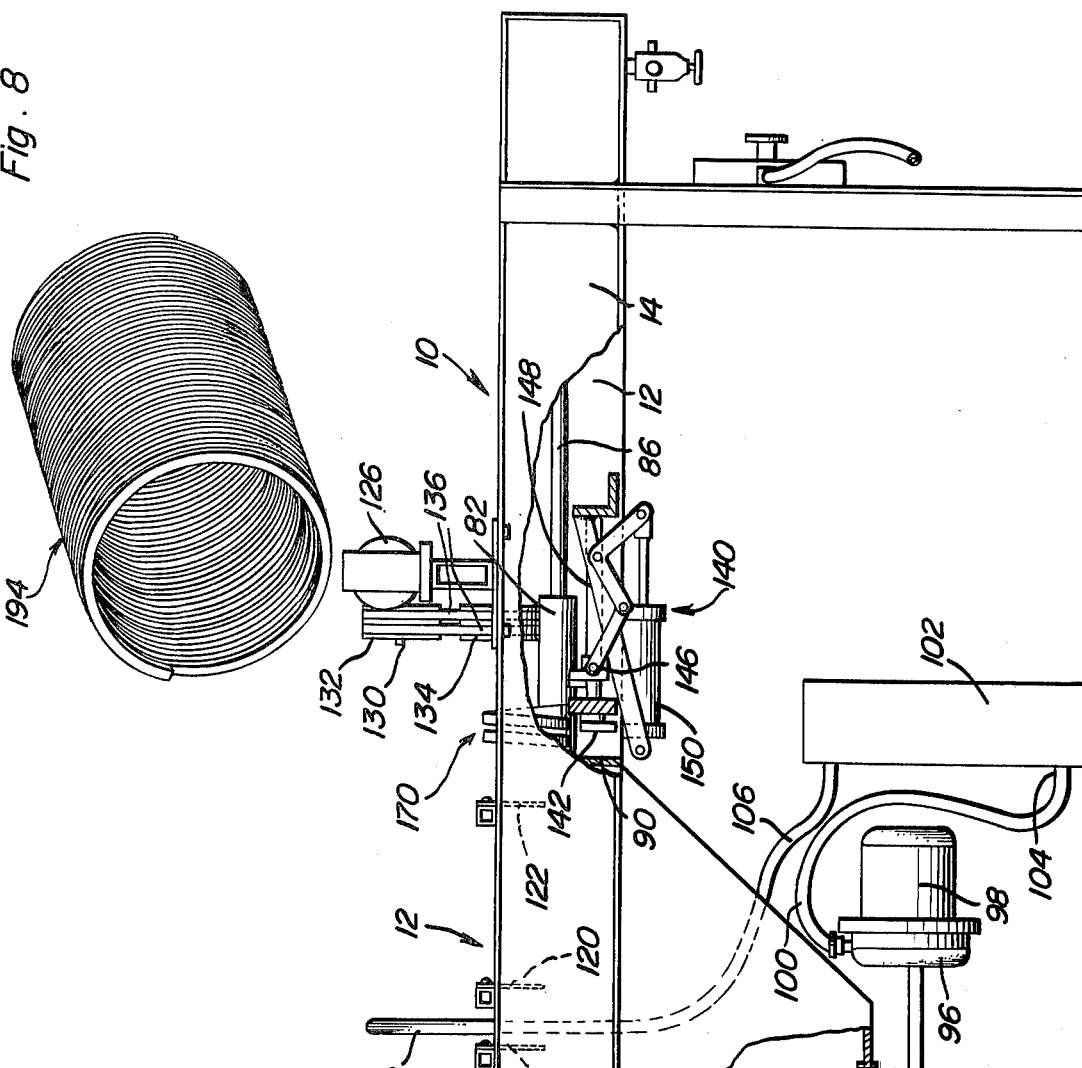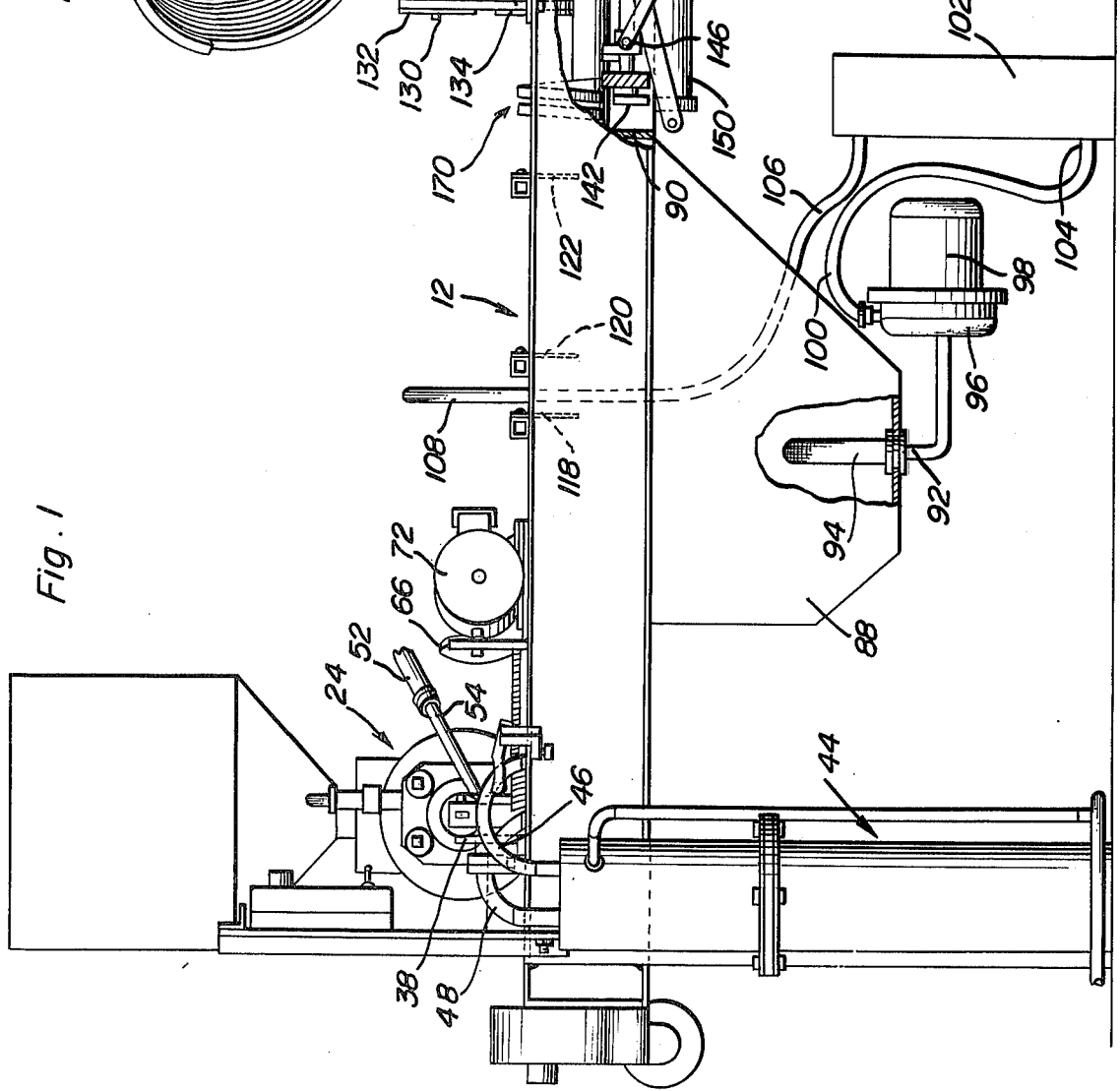
Fig. 1
Fig. 8

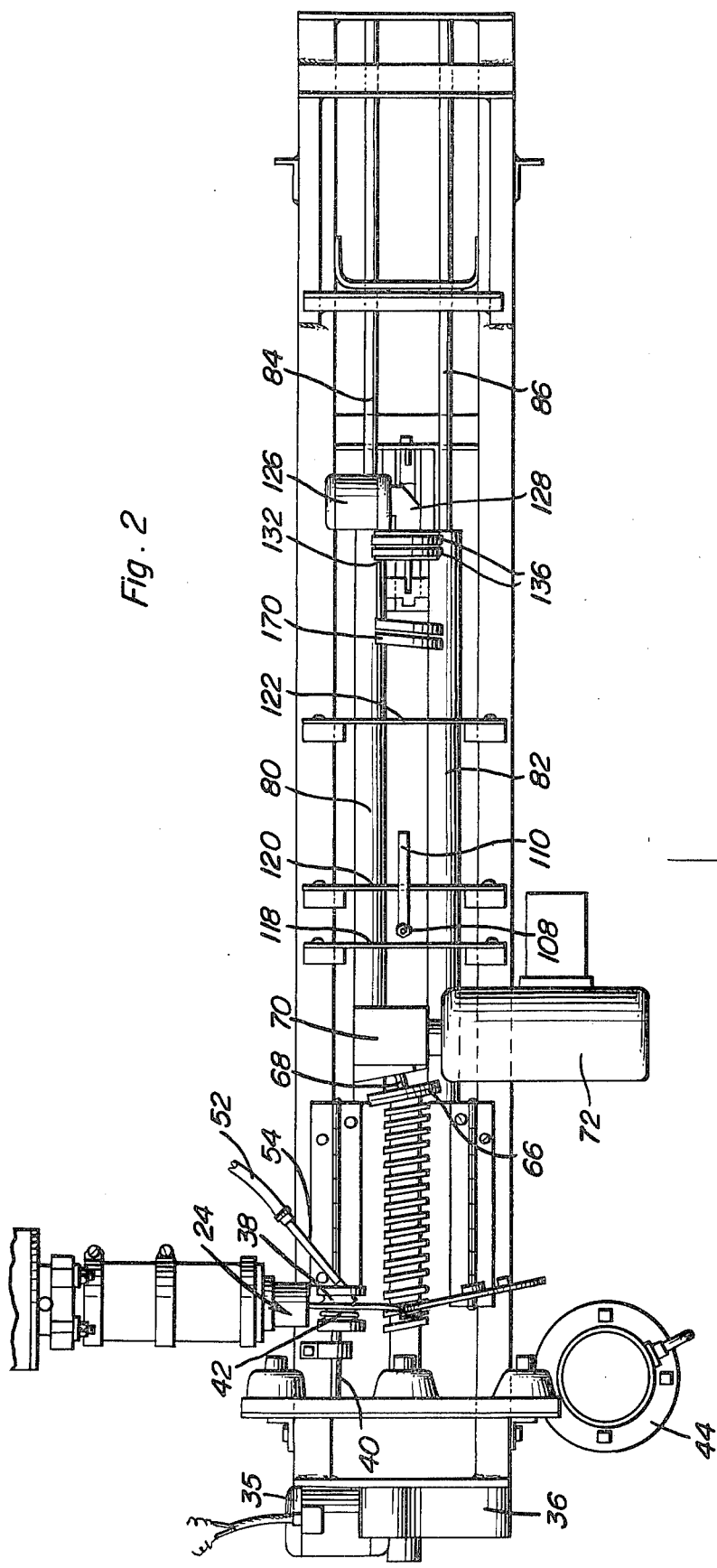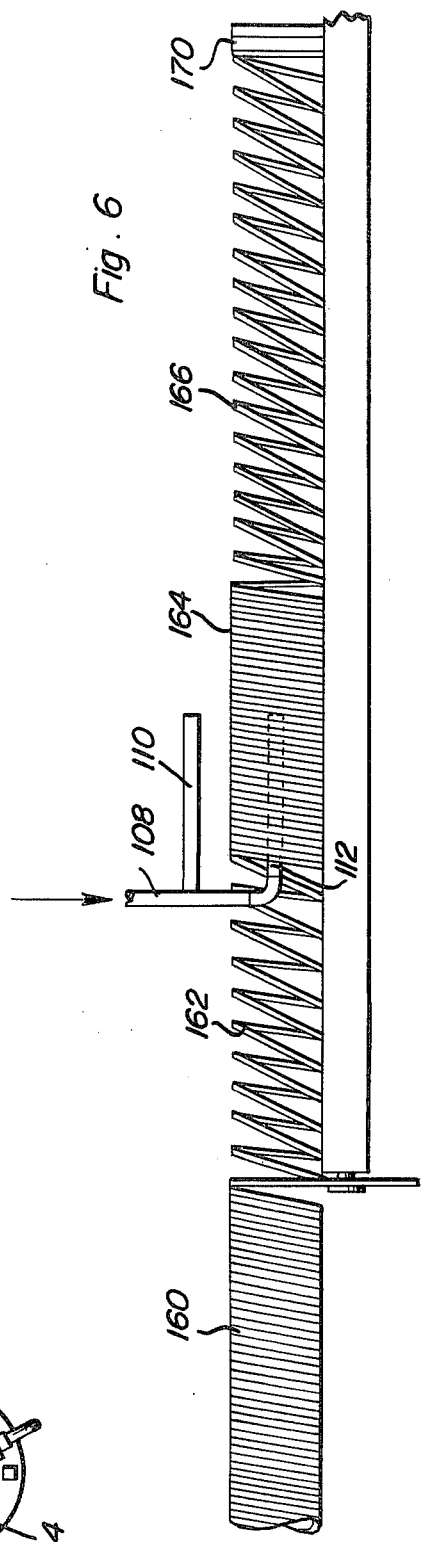

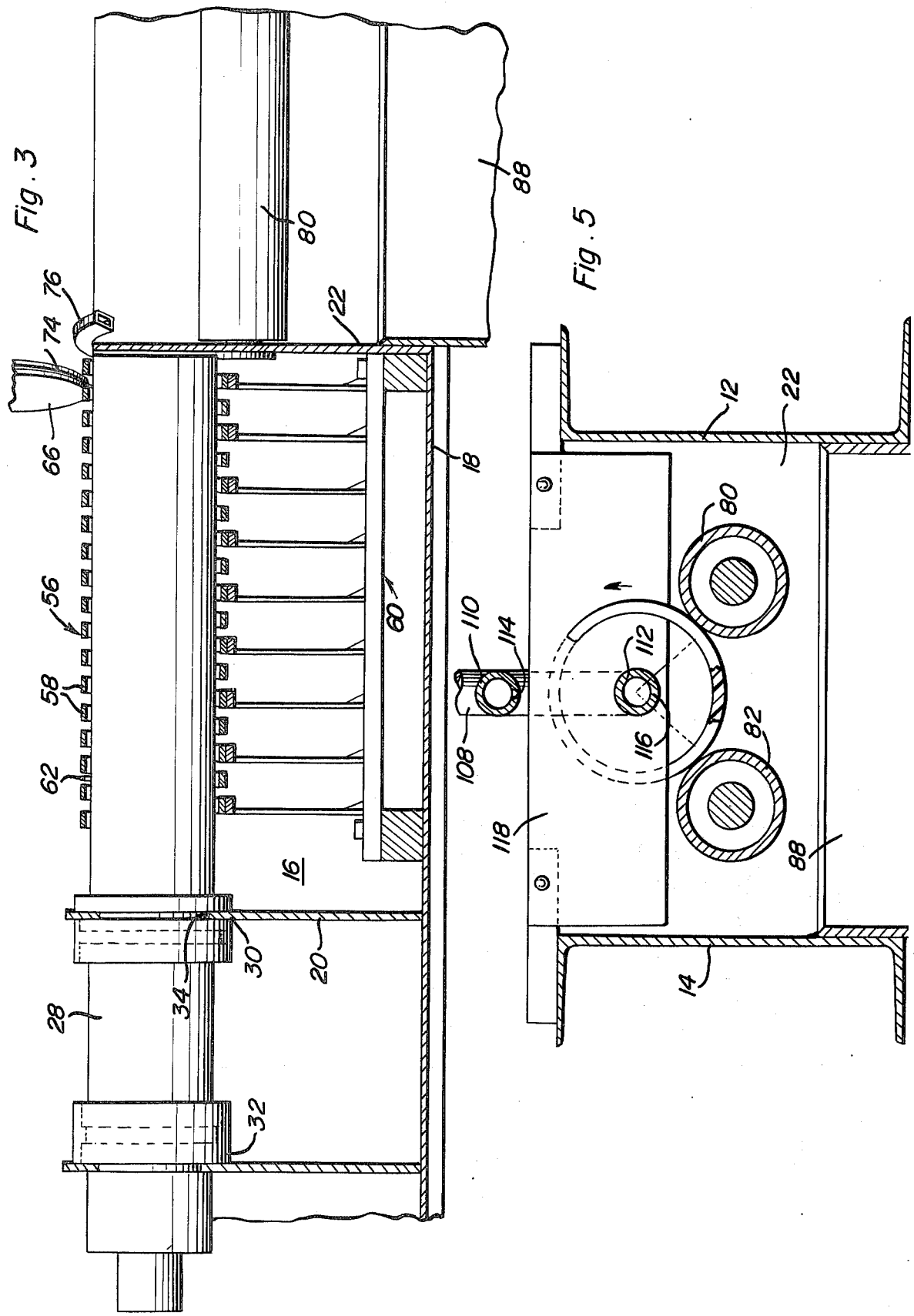

METHOD FOR PRODUCING A SPIRALLY WOUND PLASTIC ARTICLE

BACKGROUND OF THE INVENTION

Various spirally wound articles have been heretofore provided such as those disclosed in U.S. Pat. Nos. 2,415,012, 2,854,786 and 3,047,980. However, these spirally wound articles have for various reasons been subject to bending, when in use, beyond their elastic limits resulting in the articles being permanently deformed and thus reducing the desired operation of the spirally wound article.

In the case of a spirally wound toy previously constructed of metal and marketed under the name "Slinky" rough handling of the toy by children can frequently cause bending of one or more convolutions of the toy beyond their elastic limits resulting in permanent deformation of the affected convolutions. Therefore, a need exists for a spirally wound toy which will be capable of withstanding greater bending of one or more convolutions thereof without exceeding the elastic limits of the convolutions.

BRIEF DESCRIPTION OF THE INVENTION

The instant invention resides in the method and apparatus of producing a spirally wound article of thermoplastic material having a high limit of elasticity. The method and apparatus result in initial forming of an extruded strip of heated thermoplastic material which is immediately drawn down in two successive stages and initially cooled intermediate the two draw-down stages. At the end of the second draw-down stage the partially cooled strip is coiled about and advanced along a cylindrical member driven at a peripheral speed substantially equal to the speed of linear advancement of the strip in its coiled condition and the strip is frictionally engaged and driven from the discharge end of the cylindrical member at a linear speed substantially equal to the peripheral speed of the cylindrical member. The coiled strip is substantially fully cooled during its movement along the cylindrical member by being subject to a bath of liquid cooling fluid and the strip is cradled between parallel rollers upon its being driven from the discharge end of the cylindrical member with the rollers driven at peripheral speeds substantially equal to the linear speed of advancement of the coiled strip. While the strip is cradled from the rollers it is subject to annealing heat and thereafter allowed to cool while still cradled on the rollers. After the final cooling action or step is substantially completed lengths of the annealed coiled strip are cut therefrom.

The main object of this invention is to provide a method and apparatus for producing a spirally wound article of thermoplastic material with the article having a high limit of elasticity.

Another object of this invention is to provide a method and apparatus in accordance with the preceding object and which will enable a spirally wound article of thermoplastic material to be formed at high speeds and in a continuous manufacturing process from which individual predetermined lengths of spirally wound plastic may be intermittently cut.

A final object of this invention to be specifically enumerated herein is to provide an apparatus for producing a spirally wound article and which will conform to conventional forms of manufacture, be of simple construction and efficient in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the apparatus of the instant invention with parts thereof being broken away and illustrated in vertical section;

FIG. 2 is a top plan view of the apparatus;

FIG. 3 is an enlarged fragmentary longitudinal vertical sectional view of the portion of the apparatus by which the extruded thermoplastic strip is initially coiled;

FIG. 5 is an enlarged fragmentary transverse vertical sectional view illustrating the structure by which the coiled and cooled strip is subsequently annealed while cradled from parallel rollers;

FIG. 6 is a side elevational schematic view illustrating the manner in which the coiled and cooled strip is axially expanded immediately prior to the annealing step, retained in a substantially closed convolution condition during the annealing step and subsequently expanded during a cooling step after annealing and for the purpose of allowing predetermined lengths of the coiled strip to be cut therefrom during a continuous manufacturing operation;

FIG. 8 is a perspective view of a coiled plastic toy comprising a predetermined length of the coiled plastic strip.

DETAILED DESCRIPTION OF THE INVENTION

Figure 4:
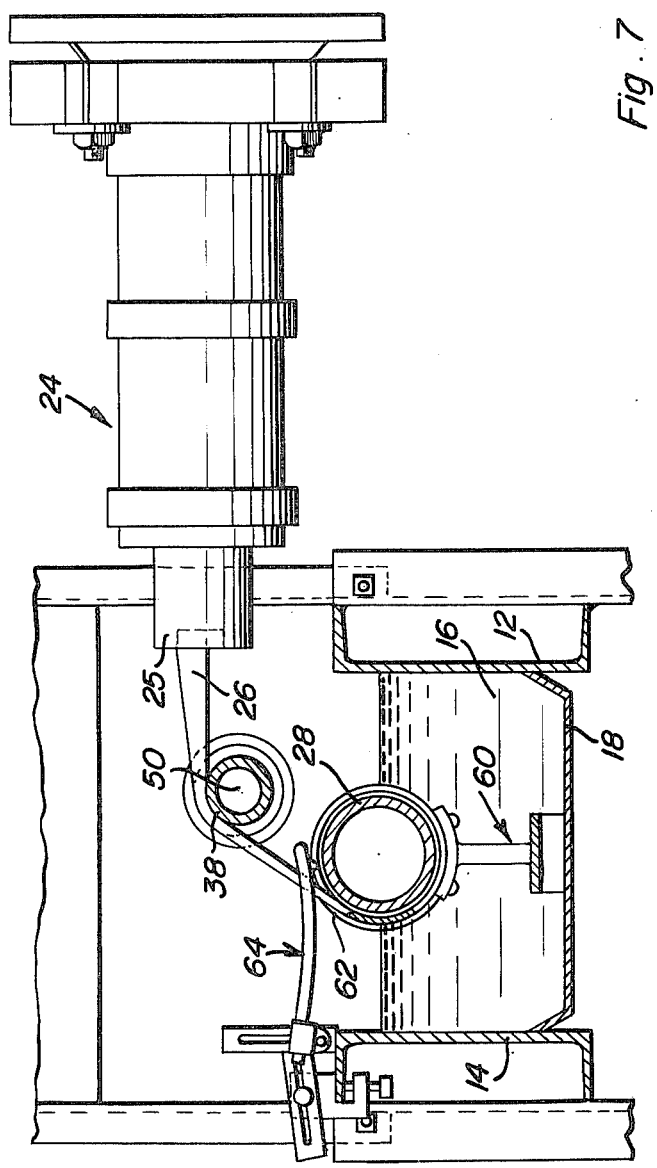
FIG. 4 is an enlarged transverse vertical sectional view illustrating those portions of the apparatus by which the strip is initially extruded, drawn down in two successive stages, cooled intermediate the successive draw-down stages and initially coiled subsequent to the second draw-down stage.

Referring now more specifically to the drawings, the numeral 10 generally designates the spirally wound plastic article producing machine of the instant invention. The machine 10 includes a legged main horizontal frame referred to in general by the reference numeral 12 and including a pair of opposite side longitudinally extending horizontal beams 12 and 14 suitably cross-braced at points spaced therealong.

An open top reservoir or tank 16 is defined between the left-hand ends of the frame members 12 and 14 as viewed in FIG. 1 of the drawings by means of a generally horizontal reservoir or tank bottom 18 secured between the frame members 12 and 14, see FIG. 4, and the opposite ends of the reservoir or tank 16 are defined by upstanding transverse end walls 20 and 22 secured between the members 12 and 14 and to the bottom 18.

A heated extrusion die assembly referred to in general by the reference numeral 24 is supported at the rear side of the left-hand end of the frame 12 as illustrated in FIG. 1 and the assembly 24 is capable of extruding a strip 26 of predetermined cross-sectional shape and thickness in a horizontal direction toward the longitudinal centerline of the reservoir or tank 16.

A spindle comprising a smooth cylindrical member 28 is journaled from the frame 12 as at 30 and 32 with one end of the spindle 28 projecting through an opening 34 into the upper portion of the reservoir or tank 16 and the other end portion of the spindle 28 driven by means of a variable speed motor 35 through a transmission 36.

A hollow grooved drum 38 is also journaled from the left-hand end of the frame 12 as viewed in FIG. 1 of the drawings and the drum is supported from a journaled shaft portion 40 also driven by the variable speed motor 35 via the transmission 36, but the drum 38 may be driven at slightly different speed ratios, if desired. The drum 38 includes a plurality of axially spaced grooves 42 extending thereabout and the grooves 42 are substantially V-shaped in cross section.

The machine 10 further includes a combined pump and filter assembly referred to in general by the reference numeral 44 and the assembly 44 may also include cooling means for cooling the liquid pumped therethrough. The assembly 44 pumps water into the tank or reservoir 16 through a supply hose 46 and draws cooling liquid from the reservoir or tank 16 into the assembly 44 through a return hose 48. In addition, the right-hand end of the drum 38 is hollow as at 50 and a second supply hose 52 comprising a discharge hose for the assembly 44 includes a nozzle 54 on its discharge end for discharging cooling liquid into the interior of the drum 38. Of course, cooling liquid discharged into the interior of the drum 38 will drain therefrom by gravity from the open right-hand end of the drum 38 as viewed in FIG. 1.

A spiral guide structure 56 is provided within the reservoir or tank 16 and disposed about the end of the spindle 28 within the upper portion of the tank 16. The guide structure 56 includes a plurality of helical convolutions 58 and every other helical convolution 58 is supported from the bottom wall 18 by means of a support structure 60, see FIGS. 3 and 4. Further, an arcuate guide or lifter member 62 is supported in position embracing the left side of the spindle 28 as viewed in FIG. 4. The arcuate guide or lift member 62 is supported by means of an adjustable support structure referred to in general by the reference numeral 64 clamped to the frame member 14.

A friction drive wheel 66 is mounted on the output shaft of a right angle speed reducing gear assembly 70 driven by means of a variable speed motor 72 and the wheel 66 includes a central peripheral groove 74. The wheel 66 is slightly canted relative to the spindle 28 so as to be disposed in a plane substantially paralleling the upper portions of the convolutions 58 and the grooved periphery of the wheel 66 has its under portion closely spaced above the upper peripheral portion of the spindle 28 between the two right-hand end convolutions 58 as viewed in FIG. 3. Still further, a tubular guide 76 is provided and passes over the upper marginal edge portion of the end wall 22.

A pair of cradle rolls are journaled from shafts 84 and 86 supported from the frame 12. The ends of the rolls 80 and 82 adjacent the end wall 22 are spaced a slight distance therefrom and a depending tank 88 is supported between the longitudinal members 12 and 14 between the end wall 22 and a further end wall 90 extending between the longitudinal members 12 and 14.

The bottom portion of the tank 88 includes an outlet line 92 provided with a filter assembly 94 disposed within the tank 88 and the line 92 opens into the inlet of a pump 96 driven by an electric motor 98. The pump 96 includes a discharge line 100 which opens into a water heater 102 as at 104 and the heater 102 includes a discharge line 106 which opens into a header pipe 108 suspended over the tank 88 between the rolls 80 and 82. The header pipe 108 extends downwardly and includes a pair of horizontal discharge sections 110 and 112 disposed at upper and lower elevations, respectively, provided with spray outlet openings 114 and 116 and with the sections 112 and 114 horizontally disposed and extending longitudinally of the frame 12, the ends of the sections 110 and 112 remote from the header pipe 108 being closed.

A plurality of spiral controlling plates 118, 120 and 122 are stationarily, but adjustably, supported from the frame members 12 and 14 and extend between the latter with the lower ends of the plates 118 spaced slightly above the rolls 80 and 82. The plates 118, 120 and 122 serve a purpose to be hereinafter more fully set forth.

Figure 7:
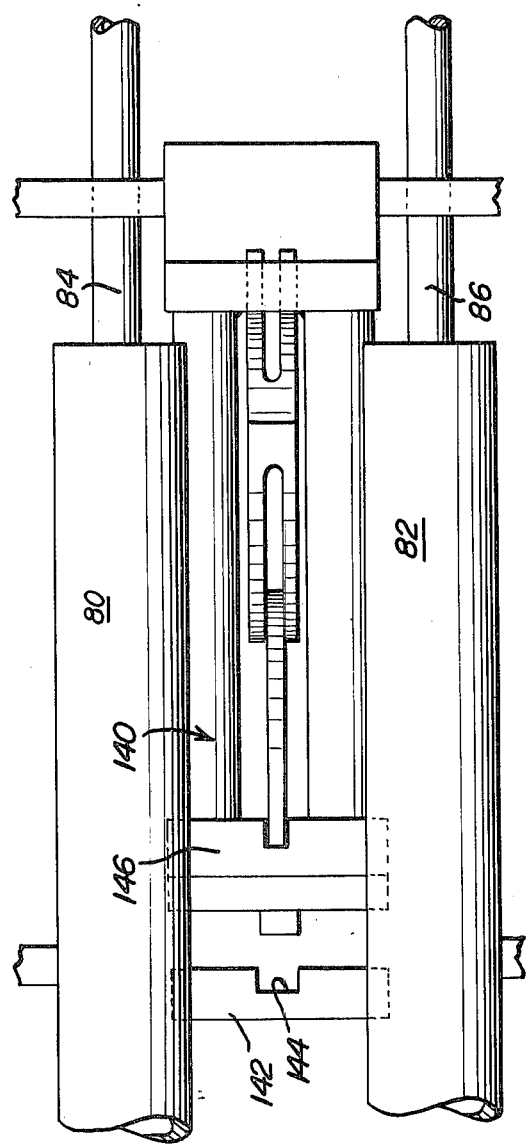
FIG. 7 is a fragmentary enlarged top plan view of the cutting mechanism for cutting predetermined lengths of the coiled strip at the end of the manufacturing process thereof.

With attention now invited more specifically to FIGS. 1 and 2 of the drawings, of variable speed electric motor 126 is supported in elevated position above the frame 12 and includes a right angle gear reduction drive 128 including an output shaft 130 upon which a double grooved wheel 132 is mounted. The output shaft 130 is horizontally disposed and extends longitudinally of the frame 12. Further, a lower wheel 134 is journaled between the members 12 and 14 and a pair of belts 136 are trained about the wheels 132 and 134 whereby the former drives the latter. The outer surfaces of the belts 136 project outwardly beyond the peripheral surfaces of the wheel or drum 134 and frictionally engage the upper peripheral portions of the rolls 80 and 82 in order to drive the latter in clockwise directions as viewed in FIG. 5 of the drawings. The outer surfaces of the belts 136 are engaged with the ends of the rolls 80 and 82 remote from the ends thereof adjacent the end wall 22 and a cutter assembly referred to in general by the reference numeral 140 is supported from between the members 12 and 14 below the ends of the rolls 80 and 82 engaged by the belts 136. The cutter assembly 140 includes a stationary die 142 notched as at 144, see FIG. 7 and a slidable cutter 146 mounted on and slidable along support rods 148 and having a double-acting air cylinder 150 operably connected thereto for moving the cutter 146 toward and away from the die 142 on each extension and retraction of the double-acting air cylinder 150.

In operation, the die assembly 24 is actuated to extrude the heated strip 26 of thermoplastic material. The drum 38 is driven in a counterclockwise direction as viewed in FIG. 4 of the drawings at a peripheral speed slightly greater than the linear speed of extrusion of the strip 26 from the die 25 of the assembly 24. Accordingly, the strip 26 is drawn down between the drum 38 and the die 25. The strip 26 is deflected about the upper periphery of the drum 38 in the manner shown in FIG. 4 and contact of the strip 26 with the drum 38 functions to initially cool the strip 26, the drum 38 being internally cooled by cooling liquid from the reservoir or tank 16 pumped through the assembly 44, the hose 52 and the nozzle 54. Thereafter, the strip 26 is guided between the arcuate guide 62 and the adjacent convolution 58 and wound about the spindle 28 between the convolutions 58. As the strip 26 advances toward the end of the spindle adjacent the end wall 22 it is engaged by the friction drive wheel 66 and received within the peripheral groove 74 formed therein. Thereafter, after one more turn about the spindle 28, the strip passes over the upper marginal edge of the end wall 22 through the closed arcuate guide structure 76 and is supported in a coiled state upon the rolls 180 and 82. The plate 118 maintains the convolutions of the coiled strip in close side-by-side relation as illustrated as at 160 in FIG. 6 and the plates 118 and 120 thereafter slightly axially expand the convolutions of the strip 126 as at 162 in FIG. 6. Further, the plates 120 and 122 serve to again maintain the convolutions of the coiled strip 26 in closely spaced relation as at 164 in FIG. 6 and after the coiled strip 26 has passed the plate 120 its convolutions are allowed to axially expand as at 166 in FIG. 6.

As the coiled strip 26 approaches the ends of the rolls 80 remote from the end wall 22, two convolutions of the strip 26 are received slidingly through a two convolution guide structure 170 supported between the rolls 80 and 82 and having a lower notch (not shown) formed therein through which the portions 142 and 146 of the cutter assembly 140 are cooperable, upon intermittent operation of the air cylinder 150, to cut the strip into the desired lengths during continuous extrusion of the strip 26.

By allowing the convolutions of the strip 26 to be slightly axially expanded as at 166 in FIG. 6 the momentary interruption of the feed of the coiled strip at the cutter assembly 140 during each actuation of the cylinder 150 does not in any way affect the controlled rate at which the strip 26 is extruded and progressively coiled into the desired article.

As the coiled strip passes between the plates 120 and 122 heated liquid from the heater 120 supplied from the tank 88 is sprayed onto the interior surfaces of the convolutions from the openings 116 and onto the exterior surfaces of the convolutions of the strip 26 from the openings 114. The heated liquid functions to anneal the coiled strip.

The grooves of the drum 38 may be embossed so as to continuously emboss the strip 26 as it passes over the drum and it is to be noted that the spindle 28 is rotated at a peripheral speed slightly greater than the peripheral speed of the drum 38 whereby the strip 26 is further drawn down between the drum 38 and the spindle 28. The cooling liquid within the reservoir or tank 116 includes a detergent whereby even though the strip 62 is convoluted about the spindle 28 and in frictional engagement therewith rotation of the spindle 28 will not effect a total driving force on the strip 26 as it passes between the convolutions 58 of the guide structure 56. Rather, the friction drive wheel 66 drives the strip from the spindle 28 at the desired linear speed. As hereinbefore set forth, the drum 38 and spindle 28 may be driven at different speeds and the speed of the friction drive wheel 66 may be varied in relation to the spindle 28. Further, the speed of the belts 136 may be varied as desired. In this manner, advancement of the strip 26 in all stages of its manufacture may be controlled so as to obtain optimum conditions.

With attention now invited more specifically to FIG. 8, a desired length of the finished coiled plastic strip is referred to in general by the reference numeral 194. This article functions in the manner of similar spring toys, but is not as subject to being flexed beyond its elastic limit so as to take an unwanted set.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of producing a spirally wound article of thermoplastic material, said method comprising extruding a heated strip of thermoplastic material from a die with the strip including opposite side longitudinal side surfaces interconnected by narrow opposite side longitudinal edges, advancing said strip past first and second stations while drawing said strip down between said die and said first station, performing controlled initial partial contact cooling of one side surface of said strip at said first station, arcuately deflecting said strip at said first station during said partial cooling of said strip and with said side edges of said strip comprising the inner and outer portions of the arcuate section of said strip, further drawing said strip down between said first and second stations, and thereafter guiding said strip, at said second station, through a plurality of strip guiding spaced convolutions about a journaled cylindrical member driven at a peripheral speed substantially equal to the linear speed of said strip and further cooling said strip through out at least a major portion of its passage through said second station.

2. The method of claim 1 including the step of driving said strip from said cylindrical member at the end of said second station at a linear speed substantially equal to the peripheral speed of said cylindrical member.

3. The method of claim 2 including the step of advancing the coiled strip from said second station through a third station in which the coiled strip is spirally advanced in axial alignment with said cylindrical member with the convolutions of the coiled strip cradled between parallel rollers driven at peripheral speeds substantially equal to the linear speed of said coiled strip, heating said coiled strip in order to anneal the same as the coiled strip is spirally advanced through a predetermined zone of said third station.

4. The method of claim 3 including the step of initially axially stretching said coiled strip as it moves through a first zone of the third station, maintaining said convolutions in close side-by-side relation as the coiled strip moves through a second zone of said third station and thereafter axially stretching said strip as it moves through a third zone of said third station.

5. The method of claim 4 wherein said predetermined zone comprises said second zone.

6. The method of claim 4 and periodically cutting said spiral strip at the end portion of said third zone remote from said second zone to obtain individual axially wound articles of predetermined length.

7. The method of claim 6 wherein heating said strip during its movement through said third zone includes spraying said coiled strip, both externally and internally, with heated liquid.

8. The method of claim 1 wherein the cooling of said strip throughout a major portion of its passage through said second station includes submersion of at least the lower portions of the convolutions of said strip in said major portion in a bath of cooling liquid.

* * * * *